United States Patent
Chen

(10) Patent No.: US 9,666,986 B2
(45) Date of Patent: May 30, 2017

(54) DETACHMENT-PREVENTION VEHICLE SOCKET

(71) Applicant: TANG YANG DIES CO., LTD., New Taipei (TW)

(72) Inventor: Hsu-Chen Chen, New Taipei (TW)

(73) Assignee: TANG YANG DIES CO., LTD., New Taipei (TW)

( * ) Notice: Subject to any disclaimer, the term of this patent is extended or adjusted under 35 U.S.C. 154(b) by 0 days.

(21) Appl. No.: 15/182,597

(22) Filed: Jun. 15, 2016

(65) Prior Publication Data

US 2017/0125948 A1 May 4, 2017

(30) Foreign Application Priority Data

Nov. 2, 2015 (TW) .............................. 104217535 U

(51) Int. Cl.
*H01R 13/639* (2006.01)
*H01R 13/622* (2006.01)

(52) U.S. Cl.
CPC ......... *H01R 13/639* (2013.01); *H01R 13/622* (2013.01); *H01R 2201/26* (2013.01)

(58) Field of Classification Search
CPC . H01R 13/639; H01R 13/622; H01R 2201/26
USPC ......... 439/34, 651, 680, 290, 701, 639, 686, 439/695, 284, 358, 638, 445, 503, 439/245–247

See application file for complete search history.

(56) References Cited

U.S. PATENT DOCUMENTS

| | | | |
|---|---|---|---|
| 4,544,226 A | 10/1985 | Lupoli et al. | |
| 4,739,126 A * | 4/1988 | Gutter .................. | H02G 3/065 174/655 |
| 6,123,567 A * | 9/2000 | McCarthy ............ | H01R 4/5033 439/427 |
| 6,705,884 B1 * | 3/2004 | McCarthy ............ | H01R 4/5033 439/394 |
| 7,097,469 B2 * | 8/2006 | Jacobs .................. | H01R 13/11 439/246 |
| 2013/0045641 A1 | 2/2013 | Schwarzbach et al. | |

FOREIGN PATENT DOCUMENTS

WO 2006094125 A2 9/2006

OTHER PUBLICATIONS

Search Report dated Mar. 7, 2017 of the corresponding European patent application.

* cited by examiner

*Primary Examiner* — Edwin A. Leon
(74) *Attorney, Agent, or Firm* — Chun-Ming Shih; HDLS IPR Services

(57) ABSTRACT

A detachment-prevention vehicle socket includes a housing (1) and an electrode body (3) installed in the housing (1). The electrode body (3) includes a movable element (31) and a resilient sleeve (32). A rotatable ring (2) is in contact with the housing (1) and is threadedly fastened to the movable element (31), so rotation of the rotatable ring (2) can drive the movable element (31) and the resilient sleeve (32) to move axially inwardly of the housing (1) and thereby clamp a cigarette lighter plug (B1) inserted in the resilient sleeve (32). Accordingly, the cigarette lighter plug (B1) can be stably fixed in the resilient sleeve (32) without loosening.

7 Claims, 5 Drawing Sheets

DETACHMENT-PREVENTION VEHICLE SOCKET

TECHNICAL FIELD

The present invention relates to a vehicle socket and, in particular, to a detachment-prevention vehicle socket.

BACKGROUND

Cigarette lighter sockets are typically provided in cars these days and when they collaborate with cigarette lighters, drivers can use the cigarette lighter sockets to light up cigarettes. However, due to the environmentally-friendly trend and personal health concerns, the function of lighting up cigarettes is gradually replaced by the function of supplying power to electronic products because a driver may need to use various electronic products, such as satellite navigation, an event data recorder and a cellphone, while driving a car.

Due to the demand in supplying power to various electronic products from the cigarette lighter socket, a variety of products are developed, e.g. a cigarette lighter socket with one-to-many expansion function and a cup-shaped power socket in a drink holder for a car. No matter what kind of the product is, a cigarette lighter plug needs to be inserted into the above-mentioned cigarette lighter socket for application. However, when driving a car on an uneven road, the cigarette lighter plug may be jolted to be detached from the cigarette lighter socket, and in solution, there are various cigarette lighter sockets developed to prevent such condition.

One kind of design for preventing detachment of the cigarette lighter plug is to make a conductive flexible plate of the cigarette lighter plug protrude more outwardly. Therefore, after the cigarette lighter plug is inserted into the socket, it fully relies on the conductive flexible plate to prevent the cigarette lighter plug from loosing. In such design, a protruding length of the conductive flexible plate is very important. If too loose, the design is not working; if too tight, the user could not pull out the plug from the socket. Moreover, in the too tight circumstance, even though the plug is pulled out, the conductive flexible plate and the wire may be left in the socket during the pulling-out process.

Please refer to FIG. 1 which shows another cigarette lighter socket A for preventing detachment of the cigarette lighter plug. An external thread A1 with a conical degree is formed on an end of the cigarette lighter socket A, where the cigarette lighter plug B is inserted. After the external thread A1 is formed, a plurality of slits A2 are formed on an outer circumferential surface. The end having the slits also includes a plurality of lateral edges A3 disposed independently. Furthermore, a hollow circular cover A5 having an internal thread A51 corresponding to the external thread A1 can be threadedly fastened to the end. This configuration prevents detachment of the cigarette lighter plug B as detailed below. Upon threadedly fastening the external thread A1 to the internal thread A51, due to the conical degree of the external thread A1, the hollow circular cover A5 exerts a compress force to the lateral edges A3, and the lateral edges A3 contracts radially inwardly by means of the slits A2, and thus the cigarette lighter plug B can be stably inserted into the cigarette lighter socket A.

The conventional cigarette lighter socket mentioned above has the following defects in need of improvement.

A manufacturing process of the cigarette lighter socket A is troublesome. After the external thread A1 is formed, a plurality of slits A2 also have to be formed on the circumferential surface, and consequently, a production cost increases. However, if it is desired to use an integral molding method, it is very complicated to design a mold for this method. Due to the fact that the socket A in the same mold includes a smooth and also externally threaded outer circumferential surface, a production yield can be affected, and the production efficiency is also reduced.

Furthermore, the slits A2 may be exposed after the hollow circular cover A5 is threadedly fastened, so it is very likely that accidentally spilled water near the socket A will enter the socket A from the exposed slits A2, and thus a short circuit may occur and cause serious damage.

Finally, since the hollow circular cover A5 has a knurl structure on its outer surface and has the internal thread A51 on its inner surface, the hollow circular cover A5 needs to have a certain thickness (in a radial direction). The external thread A1 of the socket A is formed on the outer circumferential surface of the socket A. Therefore, after the hollow circular cover A5 is threadedly fastened, the thickness obviously protrudes from the outer circumferential surface of the socket A, and as a result, the whole appearance is not attractive. If choosing to make the socket A thicker in order to match the thickness of the hollow circular cover A5, the manufacturing process will be even more troublesome, and the production cost will also increase.

SUMMARY

It is an object of the present invention to provide a detachment-prevention vehicle socket, wherein a rotatable ring in contact with a housing is threadedly fastened to a movable element in the housing, thereby the movable element can drive the resilient sleeve to move axially inwardly of the housing, thus stably clamping a vehicle plug and preventing loosening of the same.

Accordingly, the present invention provides a detachment-prevention vehicle socket, comprising a housing, a rotatable ring, and an electrode body. An accommodation space is formed in the housing, and the housing includes a first edge on its exterior surface. The rotatable ring is in contact with the first edge, and the rotatable ring has an inner threaded structure. The electrode body is disposed in the accommodation space, the electrode body includes a movable element and a resilient sleeve connected to the movable element, the movable element includes an outer threaded structure, and the outer threaded structure is threadedly fastened to the inner threaded structure. By rotating the rotatable ring, the resilient sleeve is moved axially inwardly of the housing, and the resilient sleeve contracts radially.

The present invention provides the following functions for improving the defects of a conventional socket structure.

The resilient sleeve of the present invention is not like the conventional socket structure which has a smooth and also threaded outer circumferential surface, but instead, the resilient sleeve of the present invention has a protruding ring on its surface. Therefore, when mass production of the present invention by mold is required, it is much easier than the conventional socket structures, thus saving considerable costs.

Furthermore, the resilient sleeve of the present invention is disposed inside the housing, so even when the driver accidentally spills some water near the present invention, water is prevented from entering the socket of the present invention, not like the conventional socket with exposed slits which may lead to entry of water. Moreover, the present invention further includes an end cover which also prevents entry of water.

Finally, the rotatable ring of the present invention is in contact with the housing, so it does not protrude obviously like a hollow circular cover which protrudes obviously from an outer circumferential surface of the conventional socket, therefore the present invention has a more uniform thickness and a more attractive appearance.

BRIEF DESCRIPTION OF THE DRAWINGS

The disclosure will become more fully understood from the detailed description, and the drawings given herein below is for illustration only, and thus does not limit the disclosure, wherein.

DETAILED DESCRIPTION

Detailed descriptions and technical contents of the present invention are illustrated below in conjunction with the accompany drawings. However, it is to be understood that the descriptions and the accompany drawings disclosed herein are merely illustrative and exemplary and not intended to limit the scope of the present invention.

Figure 1:
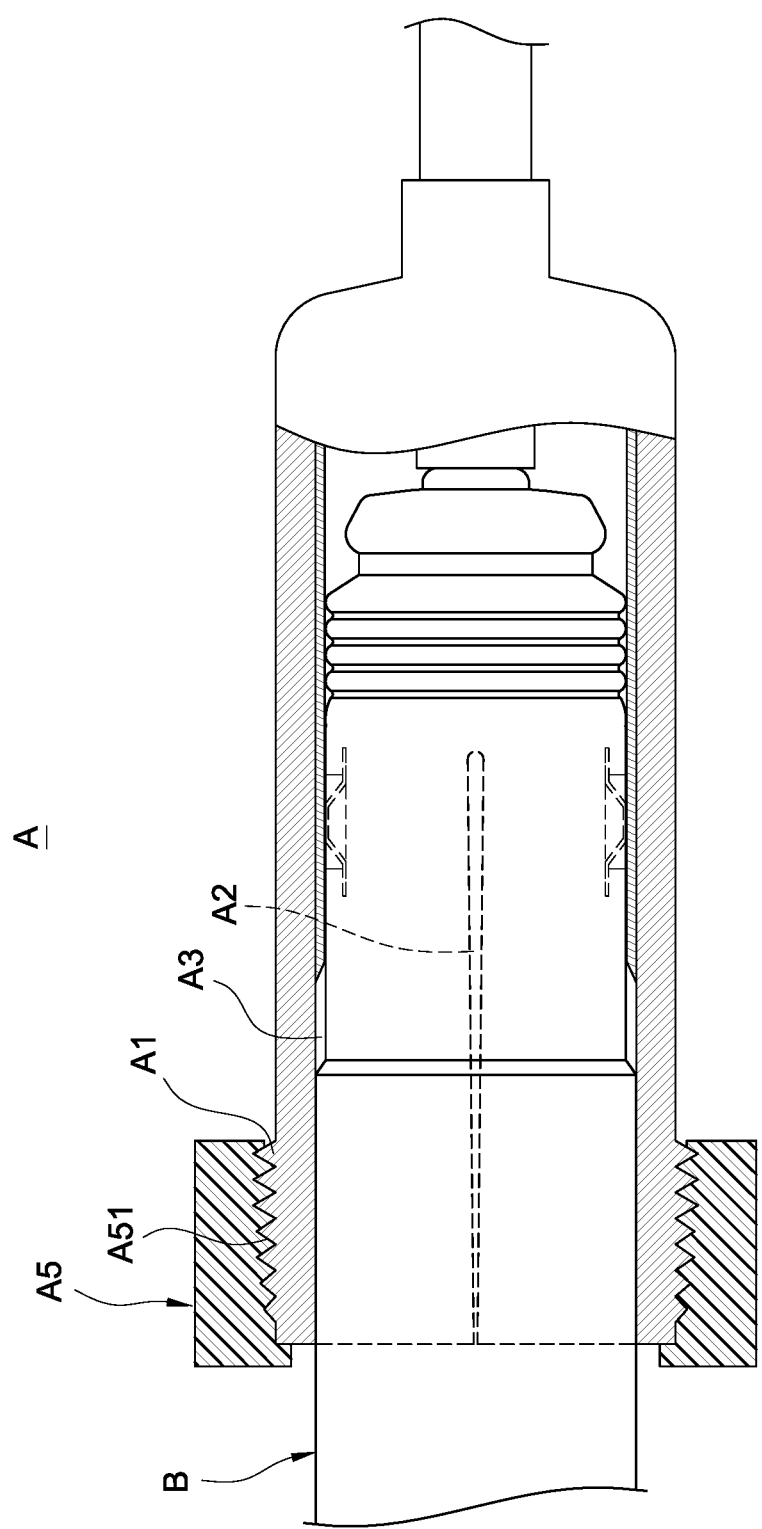
FIG. 1 is a cross-sectional view of a conventional cigarette lighter socket.
Figure 2:
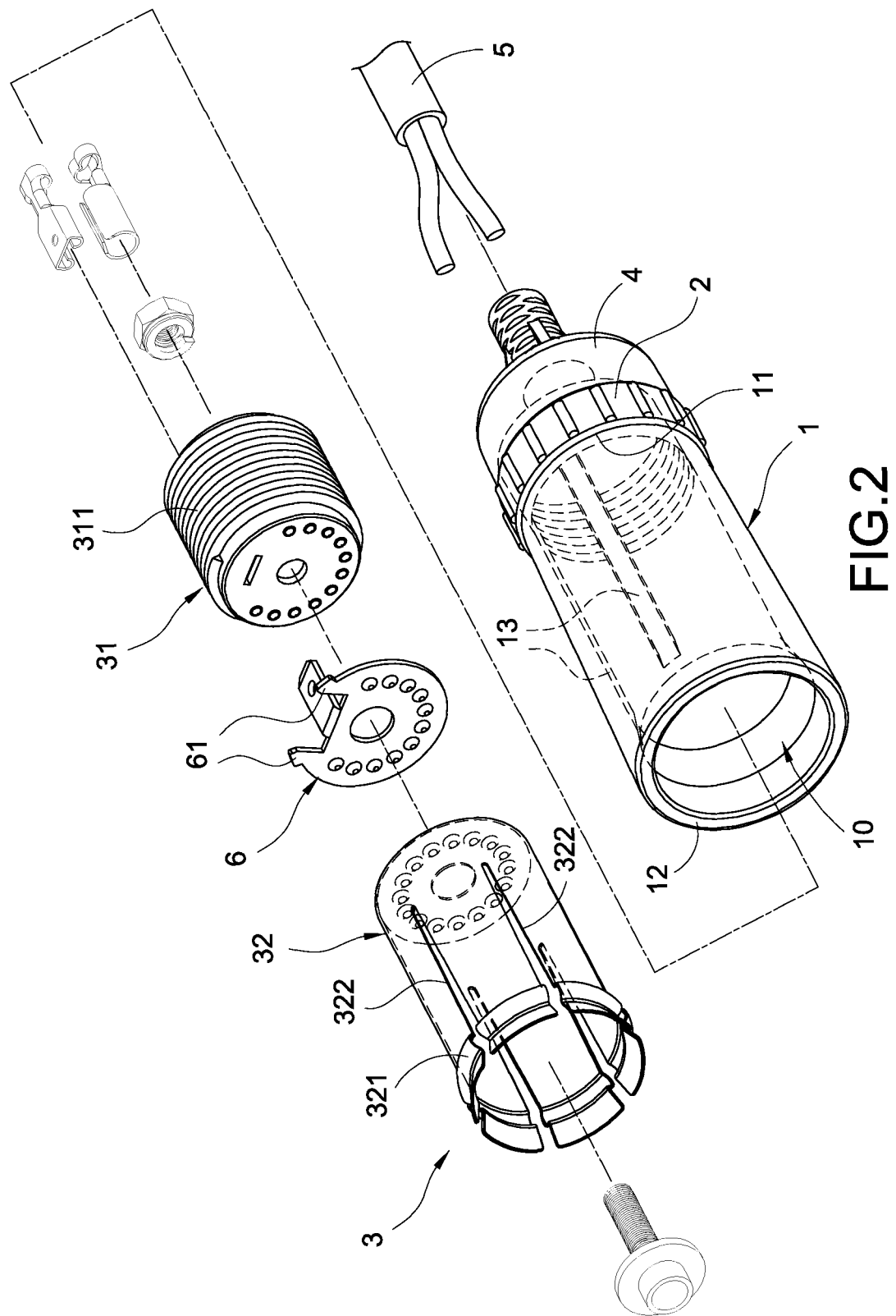
FIG. 2 is a perspective view illustrating a detachment-prevention vehicle socket according to one embodiment of the present invention.
Figure 3:
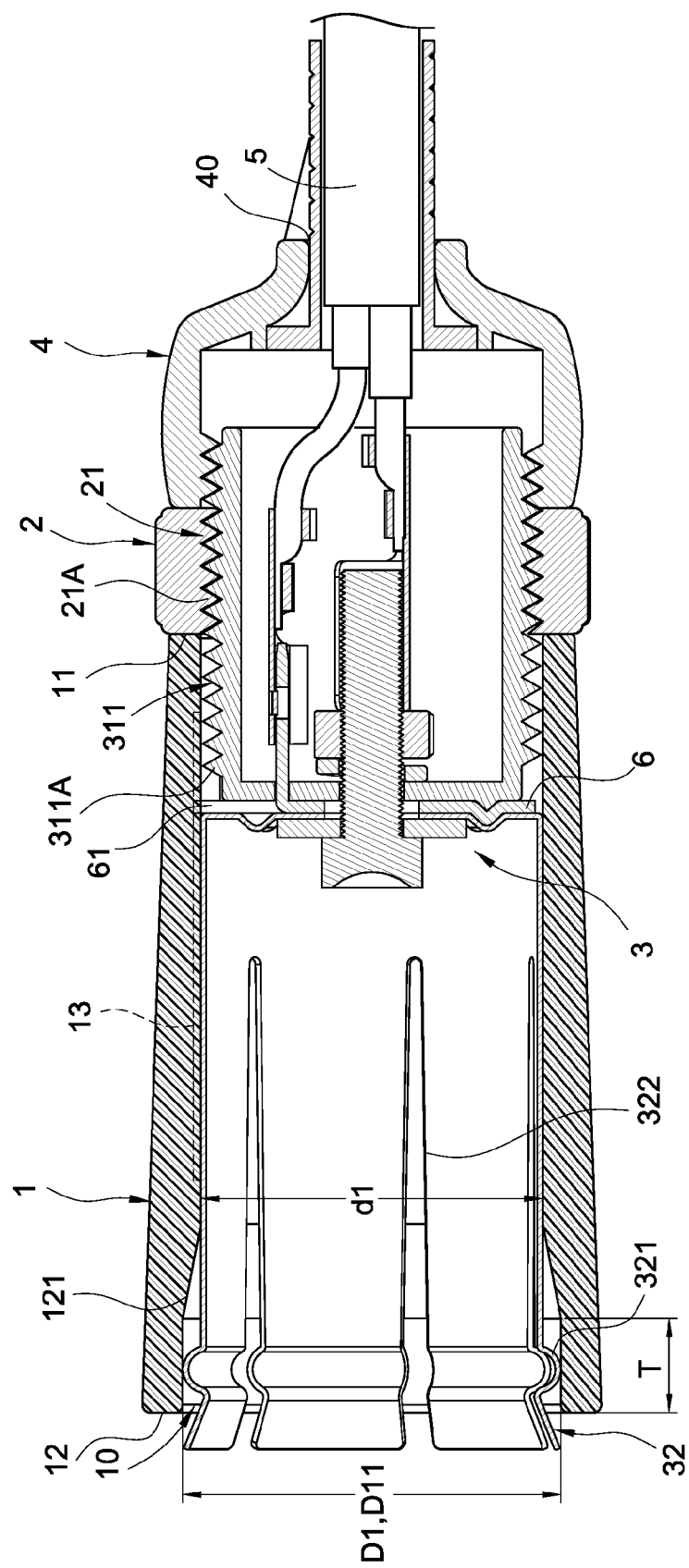
FIG. 3 is an assembled cross-sectional view illustrating the detachment-prevention vehicle socket according to one embodiment of the present invention.

Referring to FIGS. 2 and 3, the present invention provides a detachment-prevention vehicle socket, comprising a housing 1, a rotatable ring 2 and an electrode body 3.

The housing 1 is a cylindrical case in the present embodiment, and an internal shape of the housing 1 defines an accommodation space 10. The housing 1 includes a first edge 11 and a second edge 12 corresponding to the cylindrical structure. Furthermore, in the present embodiment, an inner circumferential surface of the housing 1 has two corresponding slide slots 13. The first edge 11 of the housing 1 is in contact with a rotatable ring 2 which has a knurl structure on its outer circumferential surface. The rotatable ring 2 is provided for users to rotate it. When the rotatable ring is rotated, the rotatable ring 2 is still connected to the first edge 11, i.e. the rotatable ring is not separated from the housing 1. The rotatable ring 2 includes an inner threaded structure 21. In the present embodiment, the inner threaded structure 21 is an internal thread 21A on an inner circumferential surface of the rotatable ring 2.

In the present embodiment, the electrode body 3 is a movable electrode disposed in the accommodation space 10. The electrode body 3 mainly includes a movable element 31, a resilient sleeve 32, an intervening plate 6, and a wire 5.

The movable element 31 is a short cylindrical element including an outer threaded structure 311. One end face of the movable element 31 has an installation face for connected with the intervening plate 6, and the other end face of the movable element 31 is an open end for installing an electrode member inside. According to the present embodiment, the outer threaded structure 311 is an external thread 311A formed on an outer circumferential surface of the movable element 31. The external thread 311A is threadedly fastened to the internal thread 21A. The intervening plate 6 made of metal is disposed between the movable element 31 and the resilient sleeve 32. In the present embodiment, the intervening plate 6 includes two protruding portions 61 disposed correspondingly and slidably disposed in the slide slot 13. The resilient sleeve 32 is a metallic hollow sleeve with flexibility, one end is connected to the intervening plate 6, and the other end is disposed with a protruding ring 321 and forms a plurality of slits 322.

Furthermore, the electrode body 3 includes an insulating element, a positive-pole screw, a positive-pole nut, a positive-pole element, a negative-pole element, and the wire 5. The positive-pole screw is inserted through the insulating element and passes through the inside of the resilient sleeve 32 to go out, and is inserted through the intervening plate 6 and the movable element 31 to be threadedly fastened to the positive-pole nut inside the movable element 31, and then is connected to the positive-pole element to form a positive-pole member. By threadedly fastening the positive-pole screw to the positive-pole nut, as mentioned above, the resilient sleeve 32 and the intervening plate 6 together are fixed between the insulating element and the movable element 31. The intervening plate 6 includes a protruding plate passing through the movable element 31 and disposed inside the same. The protruding plate is connected to a negative-pole element to form a negative-pole member. The wire 5 includes two metallic wires, one is connected to the positive-pole member and the other is connected to the negative-pole member, so the wire 5 can supply voltage and power to the electrode member.

Figure 5:
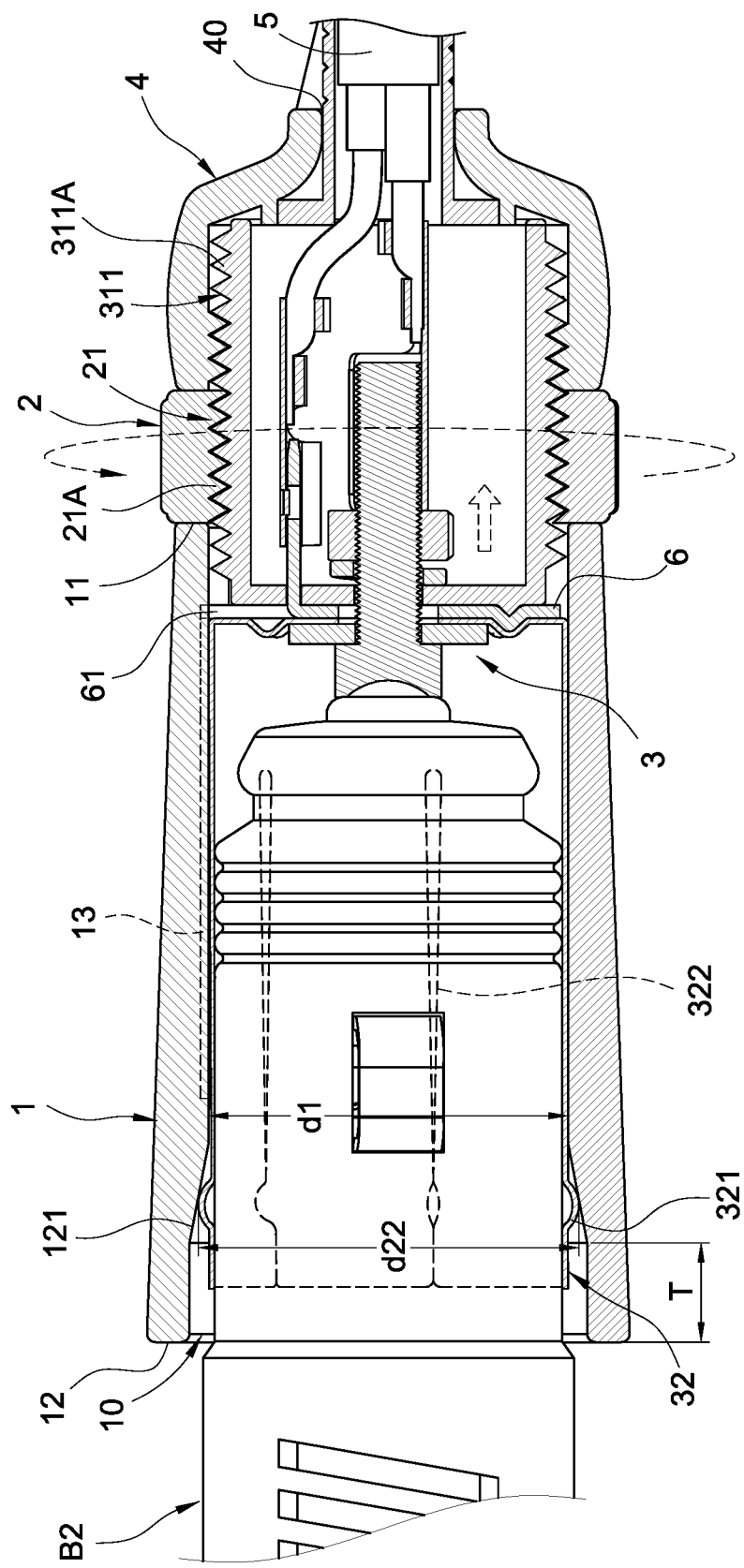
FIG. 5 is a longitudinal cross-sectional view illustrating that the detachment-prevention vehicle socket is electrically connected to the cigarette lighter plug.

Referring to FIGS. 2, 3 and 5, based on the above-mentioned connection relationship, and due to the threaded fastening between the outer threaded structure 311 and the inner threaded structure, when the rotatable ring 2 is rotated, the internal thread 21A drives the movable element 31 having the external thread 311A to move to thereby enable the resilient sleeve 32 to axially move inwardly of the housing 1, and the resilient sleeve 32 contracts radially by its own flexibility.

In the present embodiment, the second edge 12 of the housing 1 includes an inner-diameter tapered structure 121 having an inner diameter tapering from outside to inside, so the inner-diameter tapered structure 121 has a maximum inner diameter D1 and a minimum inner diameter dl. Furthermore, the housing 1 has the maximum inner diameter D1 along a distance T. The protruding ring 321 of the resilient sleeve 32 is disposed on a surface of the inner-diameter tapered structure 121. Due to the flexibility of the resilient sleeve 32 and the arrangement of the slits 322, when the resilient sleeve is driven by the rotatable ring 2 to axially move inwardly of the housing 1, the resilient sleeve 32 contracts radially toward an axial center, so that the protruding ring 321 has a first outer diameter D11 at a first position and has a second outer diameter d22 at a second position. When the protruding ring 321 is at a first position (as shown in FIG. 3), it has a first outer diameter D11 equal to the maximum inner diameter D1 of the inner-diameter tapered structure 121. When the protruding ring 321 is at a second position, as shown in FIG. 5, it has a second outer diameter d22 greater than the minimum inner diameter dl of the inner-diameter tapered structure 121, so the resilient sleeve 32 is not going to keep moving axially inside the housing 1 in a nonstop manner.

In the present embodiment, the detachment-prevention vehicle socket of the present invention further includes an end cover 4 threadedly fastened to the external thread 311A of the movable element 31 so as to be threadedly fastened to the movable element 31. The end cover 4 includes a through hole 40 for insertion of the wire 5. When the rotatable ring 2 rotates to drive the electrode body 3 to move axially inwardly of the housing 1, the rotatable ring 2 is kept connected with the housing 1, so the axial movement of the electrode body 3 exposes the external thread 311A between the rotatable ring 2 and the end cover 4. At this point, by simply rotating the end cover 4 to make it contact the rotatable ring 2, the exposed portion of the external thread 311A can be hidden again. Therefore, even if a driver accidentally spills some water near the detachment-prevention vehicle socket, water does not enter the detachment-prevention vehicle socket to cause a short circuit.

Figure 4:
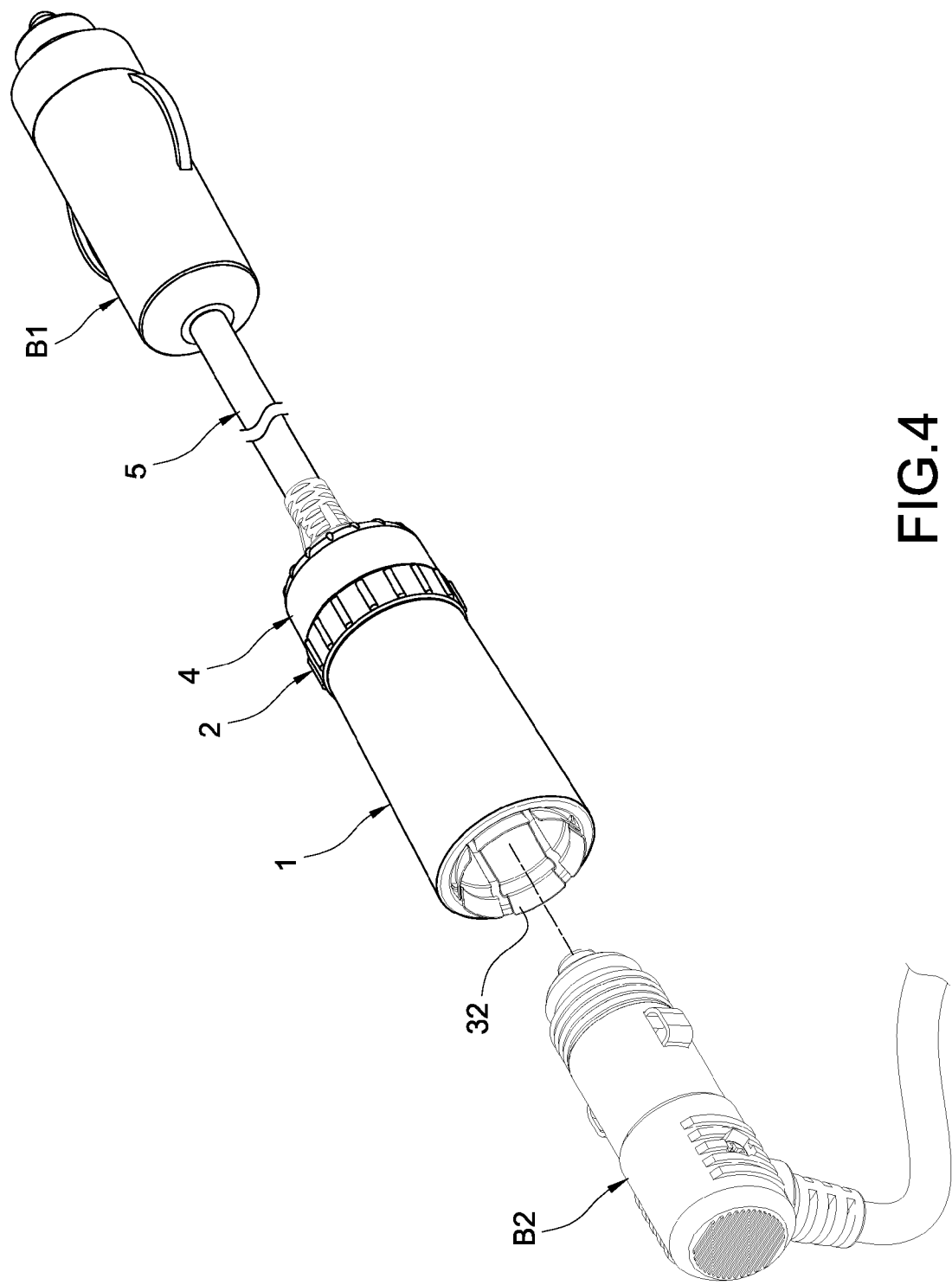
FIG. 4 is a perspective view illustrating electrically connecting a cigarette lighter plug and going to plug another cigarette lighter plug according to one embodiment of the present invention.

Referring to FIGS. 4 and 5, the present invention can collaborate with a cigarette lighter plug B1. The wire 5 extending out from the through hole 40 of end cover 4 can additionally be electrically connected to the cigarette lighter plug B1. The cigarette lighter plug B1 can be inserted in the vehicle socket to be electrically connected to a battery of a vehicle, so as to supply voltage and power to the electrode body 3. After a cigarette lighter plug B2 is inserted into the resilient sleeve 32, as shown in FIG. 5, the cigarette lighter plug B2 can be stably fixed in the resilient sleeve 32 to prevent detachment of the cigarette lighter plug B2.

It should be noted that the wire 5 does not have to be electrically connected to the cigarette lighter plug B1. In other embodiment, the wire 5 can be directly electrically connected to the battery of the vehicle. Taking a car as an example, a connection method for it in brief is electrically connecting the two metallic wires inside the wire 5 to an electronic device which has already been electrically connected to the battery of the car, for example: electrically connected to two electrodes connected in parallel from audio equipment of the car. Hence, in the present embodiment, the wire 5 need not have to be electrically connected to the cigarette lighter plug B1 and can also supply voltage and power to the electrode body 3.

It should be noted that, the present invention is not limited to be used in cars. If a motorcycle has a structure for connecting the present invention, the present invention can also be used on the motorcycle. As stated above, simply by electrically connecting the wire 5 to the wires connected in parallel from an electronic device which has already been electrically connected to a battery of the motorcycle, the driver is ready to use the present invention.

In summary, the detachment-prevention vehicle socket of the present invention certainly can achieve anticipated objectives and solve the conventional defects. The present invention also has novelty and non-obviousness, so the present invention completely complies with the requirements of patentability. Therefore, a request to patent the present invention is filed pursuant to patent law. Examination is kindly requested, and allowance of the present application is solicited to protect the rights of the inventor.

What is claimed is:

1. A detachment-prevention vehicle socket, comprising:
a housing (1), an accommodation space (10) being formed inside the housing (1), the housing (1) including a first edge (11) on an exterior surface of the housing (1);
a rotatable ring (2) in contact with the first edge (11), the rotatable ring (2) including an inner threaded structure (21);
an electrode body (3), the electrode body (3) being disposed in the accommodation space (10), the electrode body (3) including a movable element (31) and a resilient sleeve (32) connected to the movable element (31), the movable element (31) including an outer threaded structure (311), the outer threaded structure (311) being threadedly fastened to the inner threaded structure (21), wherein by rotating the rotatable ring (2), the resilient sleeve (32) is axially moved inwardly of the housing (1), and the resilient sleeve (32) contracts radially,
wherein the housing (1) further comprises a second edge (12) away from the first edge (11), the second edge (12) includes an inner-diameter tapered structure (121), the inner-diameter tapered structure (121) has a maximum inner diameter (D1) and a minimum inner diameter (d1), the housing (1) has the maximum inner diameter (D1) along a distance (T), the resilient sleeve (32) includes a protruding ring (321), the protruding ring (321) at a first position has a first outer diameter (D11) equal to the maximum inner diameter (D1) of the inner-diameter tapered structure (121), and the protruding ring (321) at a second position has a second outer diameter (d22) greater than the minimum inner diameter (d1) of the inner-diameter tapered structure (121).

2. The detachment-prevention vehicle socket of claim 1, wherein the resilient sleeve (32) includes a plurality of slits at an edge where the protruding ring (321) is disposed.

3. The detachment-prevention vehicle socket of claim 1, wherein the inner threaded structure (21) is an internal thread (21A) on an inner circumferential surface of the rotatable ring (2), and the outer threaded structure (311) is an external thread (311A) on an outer circumferential surface of the movable element (31).

4. The detachment-prevention vehicle socket of claim 3, further comprising an end cover (4) threadedly fastened to the external thread (311A).

5. The detachment-prevention vehicle socket of claim 4, wherein the electrode body (3) includes a wire (5), the end cover (4) includes a through hole (40), and the wire (5) is inserted through the through hole (40).

6. The detachment-prevention vehicle socket of claim 4, wherein the electrode body (3) further includes a wire (5), the end cover (4) includes a through hole (40), and the wire (5) is inserted through the trough hole (40) to be electrically connected to a cigarette lighter plug (B1).

7. The detachment-prevention vehicle socket of claim 1, wherein the electrode body (3) further includes an intervening plate (6) disposed between the resilient sleeve (32) and the movable element (31), the intervening plate (6) includes at least one protruding portion (61), and an inner circumferential surface of the housing (1) includes at least one slide slot (13) slidably connected with the protruding portion (61).

* * * * *